Figure 3:
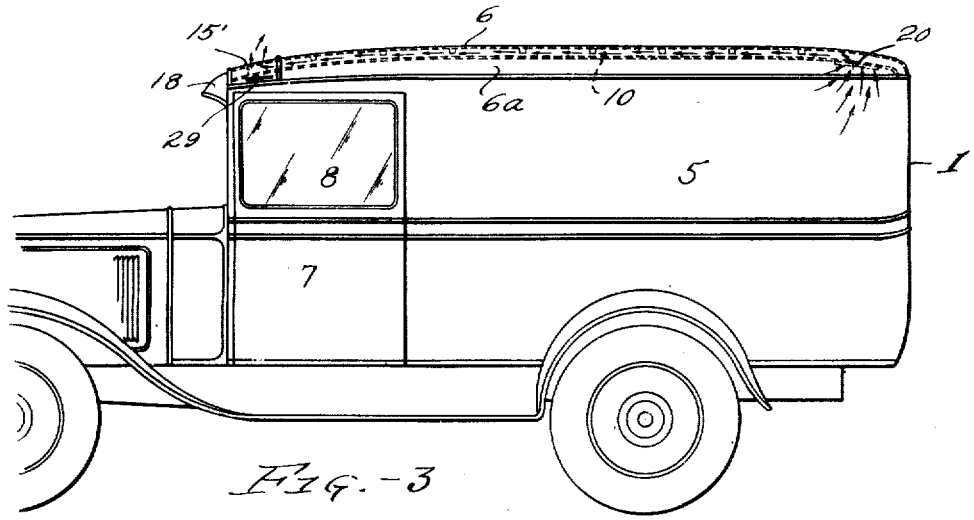

June 7, 1932. W. LINTERN 1,862,058
VENTILATING AND OR COOLING VEHICLE BODIES
Filed June 30, 1931 4 Sheets-Sheet 1
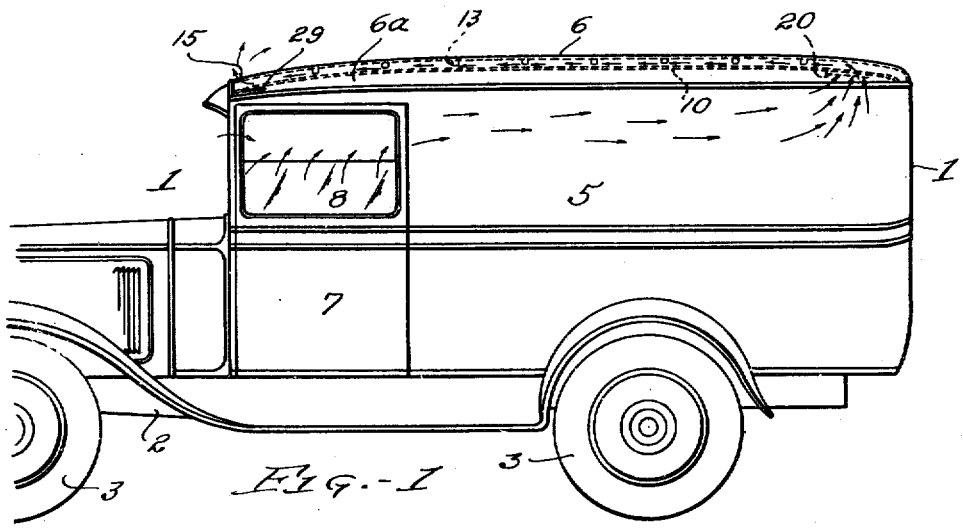
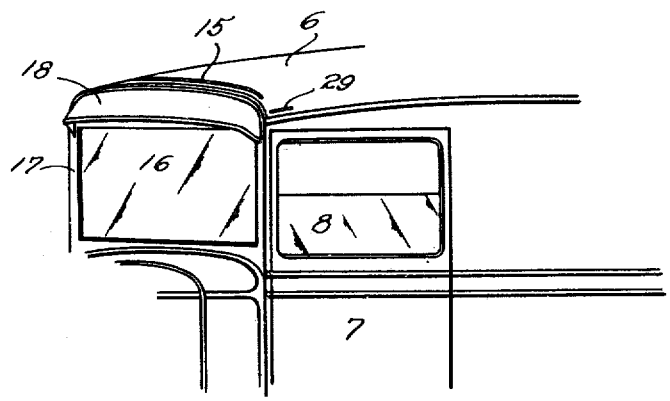

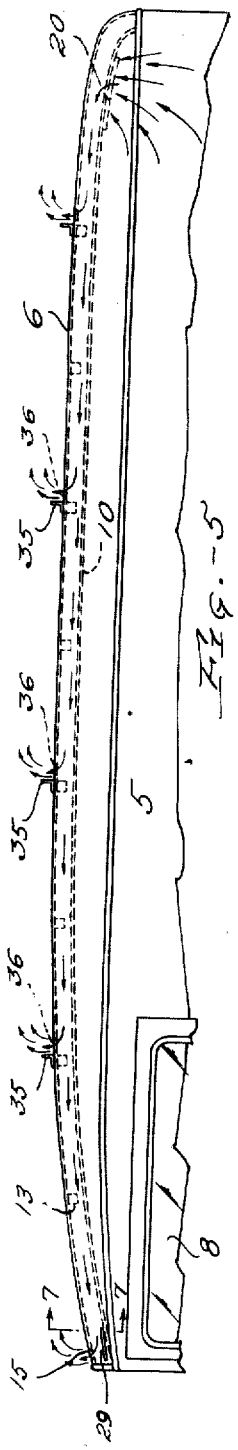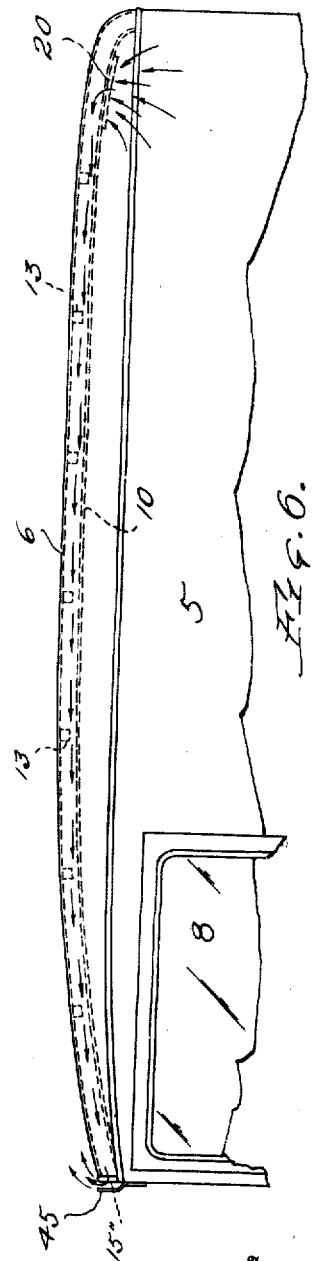

June 7, 1932. W. LINTERN 1,862,058
VENTILATING AND/OR COOLING VEHICLE BODIES
Filed June 30, 1931 4 Sheets-Sheet 4

Inventor
William Lintern
By Macklin, Soule & Leonard
Attorneys

Patented June 7, 1932

1,862,058

UNITED STATES PATENT OFFICE

WILLIAM LINTERN, OF CLEVELAND, OHIO

VENTILATING AND/OR COOLING VEHICLE BODIES

Application filed June 30, 1931. Serial No. 547,938.

This invention relates to a ventilating and cooling apparatus, method and system and the primary object is to provide for ventilating a vehicle body when ventilating is necessary and cooling the body when cooling is necessary according to seasonal requirements.

A further object is to provide a positive direction air circulating system and apparatus which will operate in a vehicle body without the use of ancillary devices, such as motor-driven fans, etc.

A further object is to provide an efficient ventilating and/or cooling apparatus and system which will operate equally effectively: (a) in a vehicle body having comparatively few or no windows; (b) having a large number of windows, and in the latter case, whether the windows are open or closed.

An important object is the provision for ventilating and/or cooling the interior of a vehicle body without interfering with the so-called design lines thereof.

Another object is to provide an improved ventilating and cooling arrangement for the roof of a vehicle body, and which arrangement also provides for ventilating and/or cooling the entire body, if desired.

Another object is the provision of a ventilating apparatus for a vehicle body which will be simple to install and which will form a part of the general construction of the body and operate to eject air in large volumes from the interior of the body.

A further object is to provide an improved all-weather ventilating and/or cooling apparatus for automobile bodies.

Other objects and novel features of my invention will become apparent from the following description relating to the accompanying drawings, wherein I have shown my preferred forms. The essential characteristics are summarized in the claims.

Heretofore, ventilating devices applied to roofs of car bodies, such as automobiles, have been characterized by high raised surfaces, that is, the addition of proturbances on such bodies which cannot, of course, blend with the lines of such bodies. I have found that by utilizing the low pressure area adjacent the forward edge of the roof of a vehicle body as a means for exhausting air from beneath the roof, I can secure adequate ventilation without adding projections or at least any such projections as will interfere with the lines of the body.

I have further discovered that in utilizing this low pressure area, I am enabled to draw air through the entire roof, which may, of course, be made hollow to serve as an air conductor. This permits air to be admitted from the body into such hollow roof space at any desired location, or at a plurality of different points, making the ventilating effect considerably more uniform than by previous methods.

In using the hollow roof type of apparatus according to my invention, particularly by placing the exit passage for air from the body to the hollow roof well toward the rear of the body, the roof is maintained comparatively cool, even in bright sunshine and hot weather.

This new system of ventilating allows considerable modification, which will be discussed in detail in connection with various preferred modifications, shown in the drawings. These modifications differ principally in matters of construction. In the preferred type a suitable opening is—or openings are—provided near the juncture of an abruptly rising surface of the front end of the body and the forward edge of the roof, and air is drawn through a conducting channel to this opening by reason of the low pressure area created at such opening when the vehicle moves forwardly. I also contemplate providing for changing the location of the low pressure area or providing additional low pressure areas by means which in a way is equivalent to that afforded by the relationship of the normal front end of the body and front edge of the roof. Ejector ventilators of known types may also be used in connection with the invention in some of its novel aspects. In providing a roof passage for air, this may be afforded by structures above or below the true roof panel as desired, but as illustrated headlining is provided below the true roof panel to form the roof passage. The relative advantages of the different types illustrated will be more fully explained below.

The invention is further characterized by the fact that, depending upon the location of the essential communicating openings, air may be circulated in two directions in the body without the use of fans or motors, for as much of the length of the body as desired. For example, by providing a roof channel the entire length of the roof and placing the opening or openings communicating between the body interior and said channel well to the rear of the roof, windows or other air entrance devices in the side wall of the body, for example, and near the front may be opened at any time and a constant circulation of air from such windows or opening rearwardly through the body, thence through the communicating openings and roof channel to the forward end of the roof, will obtain whenever the vehicle is driven forwardly. This not only constitutes a highly efficient and desirable ventilating system, but also a cooling system, particularly for the head room of the body and the roof itself. It will be noted from the further description, that where the arrangement includes a relatively wide, longitudinally extending roof passage, the entire roof may be kept cool, but as a matter of fact, any smaller portion thereof may be cooled by the same principles.

So far as I know, it is a radical departure from known or existing practice to ventilate a body by withdrawing air therefrom and at the same time, and by the same means, cooling the naturally warmest part of the body, namely, the roof.

Figure 4:
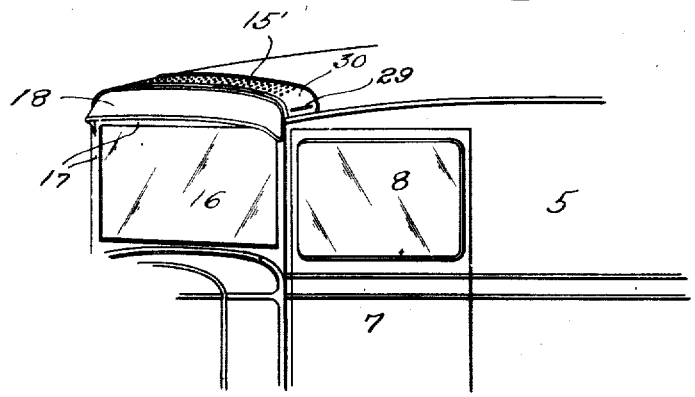
Figure 7:
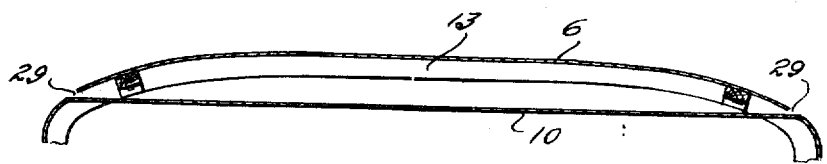
Figure 8:
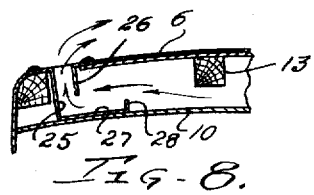
Figure 9:
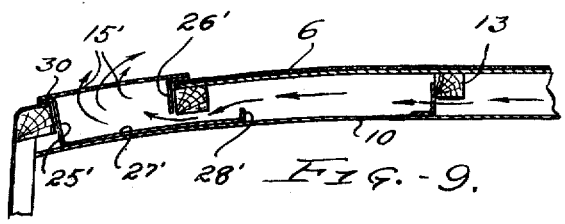
Figure 10:
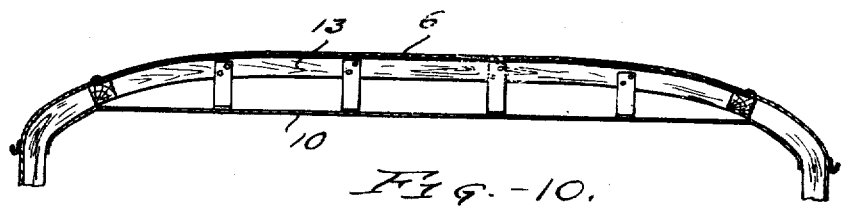
Figure 11:
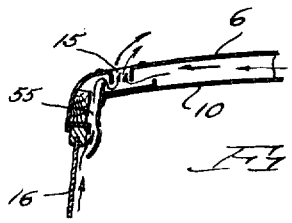

Referring to the drawings, Figs. 1 and 2 are side elevation and perspective views respectively, showing one form of the invention incorporated with a motor vehicle body (in this instance, a closed truck body); Figs. 3 and 4 are views similar to Figs. 1 and 2 of a modification; Fig. 5 is a fragmentary side elevation showing the upper portion of the motor vehicle body with the invention modified to provide a greater number of air exhaust openings; Fig. 6 is a view similar to Fig. 5 showing a further modification of the air outlet arrangement; Fig. 7 is a transverse cross sectional view taken substantially along the line 7—7 on Fig. 5; Fig. 8 is a fragmentary view taken longitudinally of the forward and upper portion of the body shown in Fig. 2; Fig. 9 is a longitudinal fragmentary sectional view similar to Fig. 8 but showing the preferred detailed construction of the air outlet shown in Fig. 4; Fig. 10 is a detail cross sectional view through the roof in any of the illustrated types showing the manner in which the headlining may be supported in ordinary roof construction, and Fig. 11 is a diagrammatic view showing the invention adapted to serve as a defrosting or vapor reducing device for a windshield.

Referring in detail to the drawings, Figs. 1 and 2 show a conventional delivery truck type body at 1 mounted on a suitable chassis 2 supported on wheels 3 in the usual manner. The body, as shown, has generally closed side walls, one being shown at 5, a generally closed roof at 6 and doors at the driver's position, one being shown at 7. The doors are equipped with the usual vertically adjustable window sections, indicated at 8. Other portions of the body may, of course, be provided with windows and otherwise modified.

Briefly, the invention, as shown in these figures, comprises the provision of a headlining 10, comparatively close to the top or roof panel 6, but spaced therefrom a suitable distance to provide the necessary air passage. As shown in all figures, the headlining is also spaced vertically from the usual cross ribbing 13 of the roof construction, but the cross ribbing may be used to suspend the headlining in the manner shown in Fig. 10. Instead the cross ribbing may have holes or recessed bottom surfaces (not shown) to provide for air passages while securing the headlining directly adjacent the ribbing. As shown in the Fig. 1 group, an elongated opening is provided at 15 near the abruptly rising front end of the body, this being afforded in the form shown by the usual windshield 16 and frame 17 therefor. The visor 18 may or may not be present. It has been mentioned that the provision of an opening or openings as at 15, for example, adjacent the abruptly rising surface presented by the vehicle front end construction, will very forcibly exhaust air from the interior of the body, assuming passages therefrom, because of the low pressure at this region resulting from moving the vehicle forwardly.

The headlining 10, as shown, extends to the rear end of the roof and may be substantially closed against the roof at its side edges in the manner suggested in Fig. 9, for example, and similarly joined at its rear edge to the top or rear wall in any suitable way (not shown). Near the rear end of the roof and associated with the headlining 10 is a suitable adjustable exit opening 20, comprising preferably the usual adjustable grille or shutter device, by which the air passage from the interior of the body into the space between the headlining 10 and the roof panel 6 may be adjustably governed. It is to be understood that the number and location of the exit openings 20 may be changed in accordance with conditions, such as the desire of manufacturers, the length of the body, the type thereof (whether for passenger, truck or other service) and to suit whatever conditions may arise. Additional openings at spaced points longitudinally of the body provide greater control of air exhaust from the body, but I have found do not aid materially in the ventilating and cooling effect, as one or more openings near the rear portion of the roof are adequate in most cases. Air may be admitted into the body in any suitable fashion, and when, for example, the windows in the doors 7 are open, a forcible circulation of air throughout the full extent of the body in both directions results, the air being forcibly drawn through the body, thence the openings 20, thence through the passage between the headlining and roof panels, thereby cooling the roof, the air being finally exhausted at the openings 15.

The matter of weather protection and drainage at the exhaust opening or openings may be variously taken care of. As shown in Fig. 8, the opening 15 is provided with baffle members 25 and 26 forwardly and rearwardly thereof respectively. Both are preferably coextensive with the opening and joined at their respective ends. The baffle 26 is spaced from the headlining an adequate distance to allow free passage of air. The baffle member 25 may be continued along the headlining 10, as at 27 and bent to form an upstanding flange 28 to impede rearward flow of water along the headlining and provide a water channel extending from one side of the roof to the other. Suitable drainage openings are provided (see 29, Figs. 1 and 2) through the downwardly turned portions 6a of the roof panel, to which the baffle and channel members 25—28 may be joined in abutting relation in any suitable way.

Figs. 3 and 4 are very similar to Figures 1 and 2, except that a reticulated opening is provided in order to form the necessary air exhaust passage while acting as a guard against the entrance of foreign substance. As shown, this comprises a continuous plate 30 with a large number of openings 15' forming the exhaust passage for air, and, as shown in Fig. 11, there is a baffle arrangement including parts 25', 26', 27' and 28', which include a channel for conducting water to the sides of the roof structure, the plate 30 being preferably removably secured to flanges 33 formed as continuations of the baffle members 25' and 26'. The members just described may comprise a unitary structure which is simply inset into an adequate single opening in the top of the roof between the headlining 10 and true roof panel 6.

Fig. 5, in addition to the forwardly disposed exhaust opening 15 and the necessary ancillary parts, illustrates diagrammatically the provision of a plurality of air abutments or suitable rising surfaces at 35, any suitable number being provided crosswise of the body top and adjacent to which are exhaust openings 36 rearwardly therefrom in order to be subjected to the low pressure area formed by movement of the vehicle forwardly with the air currents impinging on the rising surfaces 35. With this construction, any suitable and preferably controllable openings in the headlining 10 may be provided. As shown, there is one rearwardly disposed air exit device 20.

Another modification shown in Fig. 6 is illustrated to show that the forwardly disposed opening or openings 15" (say in accordance with Figs. 2 or 4) may be flush with the front surface of the body at the roof instead of being directed upwardly as when placed in the roof panel, as previously described. An abruptly rising member of any suitable form is in this case built out at 45 forwardly of the opening 15" to create the necessary low pressure to effect withdrawal of air from the space afforded between the headlining and roof. This modification presents practically no drainage problem, as will be obvious.

Referring to Fig. 11, this illustrates the adaptability of the present method and apparatus to uses other than cooling and/or ventilating. This figure, more or less diagrammatically shows the opening 15 in the roof panel 6, beneath which the headlining 10 is provided as before, to form an air passage. At the front end of the headlining panel, a forwardly and downwardly extending passage or duct is formed as at 55 terminating adjacent the upper portion of the windshield. In operation, due to the exhaust value of the low pressure area at the opening 15, generated as above described, air currents will be drawn through the duct 55, thereby causing a rapid upward drift of air over the windshield, keeping it clear of vapor or frost.

Suitable piping from the opening or openings 15 to any other parts of the body may be provided in order to exhaust air from such parts (not shown).

From the above description, it will be seen that all forms of the present invention may be incorporated with more or less standard designs of motor vehicle and other body constructions without changing the outward appearance thereof materially or, as a matter of fact, changing the principles of construction in any way. The greater exhaust effects incident to withdrawing air from a motor vehicle closed body or parts thereof in the manner herein shown and described, results in the several advantages which have been heretofore mentioned and which include, by way of summary, the following:

Where advantage is taken of the extremely low pressure area at the juncture of the body top or roof and the windshield and associated parts, an extremely wide front is available, permitting the use of a very narrow opening that will give performance equal to or greater than that of the larger of the prevalent type of roof ventilators. The volume exhausted by even a narrow opening, say of the proportions shown in Fig. 2 at 15, is sufficient to cause active circulation of air over the entire roof, or as much thereof as desired, either longitudinally or transversely of the roof. By reason of this, weather problems are practically solved and points of air exit from the general space to be ventilated, such as the general interior of a vehicle body, are optional, affording the result of maximum ventilation for maximum requirement, all without impairment to the roof cooling characteristics obtainable.

Further, with the present method and apparatus, ventilating and cooling is greatly assisted by the provision of window or door openings, since I have determined by practical tests that notwithstanding which of various windows in passenger cars and coaches are opened, the greater exhaust effects afforded by the present method maintains a positive directional flow of air currents. This is a great advantage because in all cases an all-weather ventilator must be certain to avoid exhaust air under all conditions to avoid drawing rain or dust, for example, into the space to be ventilated. The present arrangement and system, further, eliminates all mechanically operated ancillary devices, such as motors and fans while securing adequate positive air current flow.

The claims in this application are limited to the species of the above described invention shown, for example, in Figs. 1 to 5, 8, 9 and 11 and corresponding details. It is to be understood that I do not in this case claim generically the broad invention exemplified by Fig. 6, representing one species, and Figs. 8 and 9 e. g., representing another. Such generic claims as I may be entitled to on the basis of the within disclosure are incorporated in my divisional and continuation application, Ser. No. 589,019, filed January 26, 1932. Said divisional and continuation case also contains my specific claims on the arrangement of Fig. 6 e. g., which has, as shown above, distinct advantages (particularly with relation to facilitating drainage) over the herein disclosed embodiments of the invention herein specifically claimed.

I claim:

1. In a vehicle body, a front vehicle body wall, top and side vehicle body walls merging with said front vehicle body wall and extending rearwardly therefrom, whereby upon forward movement of the body a low air pressure area is created extraneously of the body closely adjacent and behind the effective upper limit of the front vehicle body wall by air caused to flow upwardly from said front vehicle body wall and to turn rearwardly behind the effective upper limit thereof, and means having an outlet disposed at the upper surface of the top wall and communicating with the low pressure area and an inlet communicating with the interior of the body.

2. A ventilating apparatus for a vehicle body, said body having a roof, a front wall for the body, a portion of which forms an air stream deflecting means on said body providing a low pressure area above the roof surface closely adjacent the forward end thereof when the vehicle is propelled forwardly, an opening in the roof at said area, and an air duct incorporated in the roof, arranged to convey air from the interior of the body to said opening.

3. In ventilating apparatus for a vehicle body, a vehicle body roof and front vehicle body wall, an upwardly facing opening in the roof closely adjacent the forward end thereof, means associated with the roof and providing an air duct communicating the said opening with the interior of the body, deflecting means including a portion of the front vehicle body wall and associated with the opening forwardly thereof and cooperating therewith by deflecting air, which normally passes over the front vehicle body wall surface when the vehicle is in motion forwardly, upwardly beyond the plane of the roof at said opening, to forcibly and positively move air from the body through said duct.

4. In ventilating apparatus for a vehicle body, said body having a front wall and a roof, the latter including an upper roof member, an exterior opening in said roof member closely adjacent the forward end thereof, said opening having an effective length transversely of the body many times its effective width, said front wall affording deflecting means cooperating with said opening by creating a low air pressure area above the said opening and coextensive therewith upon forward movement of the vehicle, for ejecting air from the body through said opening.

5. A vehicle body ventilating apparatus, comprising a vehicle body roof structure, including an upper and outer wall, means forming an air channel in said vehicle body roof structure, an opening in said upper and outer wall of said roof structure closely adjacent the forward edge thereof and communicating with said channel, air stream deflecting means disposed with relation to the opening to cause withdrawal of air from the opening when the vehicle is moved forwardly, means to convey air from the vehicle to said channel, and means for draining water from the channel at one side of the roof structure.

6. A ventilating apparatus for a vehicle body having a roof, said body roof comprising two roof members in superimposed relationship and spaced to provide an air channel, means providing a low pressure area above the upper roof member near the forward edge thereof, when the vehicle is propelled forwardly, an opening in said upper member at said area, whereby air will be withdrawn from said channel, and an opening in the lower roof member communicating between the interior of the body and said channel.

7. A ventilating apparatus for a vehicle body having a substantially closed roof, means providing an air channel extending parallel to the roof and close thereto, an upwardly facing opening in the roof near its forward edge communicating with said channel, air deflector means forwardly of said opening arranged to create a low pressure area over said opening when the vehicle is moving forwardly, and an opening providing air communication between the interior body space and said channel a material distance from the first mentioned opening whereby air from the body is constrained to travel parallel to said roof surface, thereby cooling portions of the roof.

In testimony whereof, I hereunto affix my signature.

WILLIAM LINTERN.